UNITED STATES PATENT OFFICE.

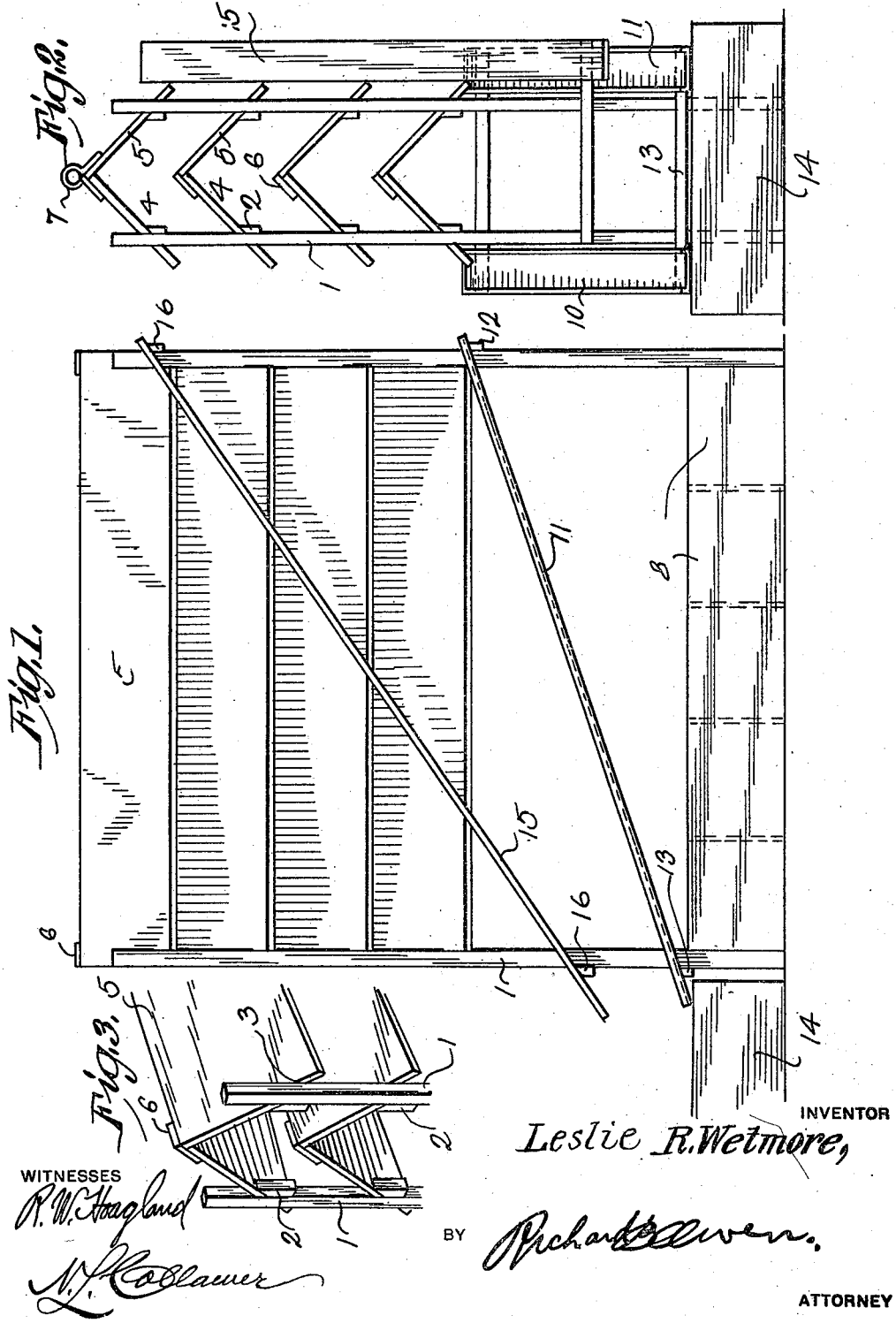

LESLIE R. WETMORE, OF OKMULGEE, OKLAHOMA.

ROOST FOR FOWLS.

1,275,342.  Specification of Letters Patent.  Patented Aug. 13, 1918.

Application filed March 13, 1918. Serial No. 222,151.

*To all whom it may concern:*

Be it known that I, LESLIE R. WETMORE, a citizen of the United States, residing at Okmulgee, in the county of Okmulgee and State of Oklahoma, have invented certain new and useful Improvements in Roosts for Fowls, of which the following is a specification.

This invention relates to animal husbandry, and more especially to housing devices for fowls; and the object of the same is to produce a roost made up of a series of superposed perches of specific shape so that the droppings from the fowls on higher perches will not fall on the fowls below.

A further object is to collect the droppings for subsequent use. A further object is to so construct the roost that a series of nests may be disposed beneath the perches, without receiving droppings from them.

Details of the preferred embodiment of my invention are set forth below and shown in the drawings, wherein:—

Figure 1 is a side elevation of this roost complete,

Fig. 2 is an end elevation thereof, showing a slight modification on the uppermost perch, and Fig. 3 is a perspective detail of a fragment.

In the drawings I have shown four posts 1 arranged in two pairs spaced at proper distances, and on the contiguous faces of the members of each pair are fastened blocks 2 disposed opposite each other in pairs and the pairs above one another as best seen in Fig. 2. These blocks in turn support the extremities of a series of superposed perches, said extremities being possibly notched out as at 3 to pass around the posts as indicated in Fig. 3. I might say here that such is the illustrated embodiment of my invention, although I do not wish to be limited at all to details. The parts described follow a structure which I have successfully used, and these parts may be made of lumber or otherwise. If such be the case, then each perch is made of two boards 4 and 5 standing substantially at right angles to each other throughout their length and with their upper edges in contact, and the perch as a whole may be said to be transversely arched, or more specifically A-shaped in cross section like an ordinary ridge roof, the boards (which would be the gables of the roof) lapping the posts slightly as perhaps best seen in Fig. 2. The top of the arch or the ridge of the roof in this illustration is where the boards meet at an angle, and at this point they may be fastened by blocks or strips as indicated at 6. As it is upon this angle that the fowls are to rest, the angle may be said to constitute the roost proper; and I reserve the widest latitude as to its exact shape and configuration. At the top of Fig. 2 I have indicated how the element 6 might carry a ridge pole 7 serving as the roost proper, and this of course would be possible whatever the shape of the arch so long as the gables incline away from such pole in both directions as shown, the purpose being to catch the droppings from the fowls on one perch so that they shall not fall on the fowls or perches below. It is true I have shown the boards 4 and 5 as all of the same width, but it is quite possible to increase the width of the boards in the lower perches without departing from the spirit of my invention. In Fig. 1 I have shown a row of nests 8 which here stand upon the ground or floor, and obviously the lowermost perch checks all the droppings to these nests so that the latter are kept clean.

For the purpose of collecting the droppings which may subsequently be used for fertilizer and otherwise, I may employ troughs 10 and 11 disposed in inclined position beneath the edges of the lowermost perch and supported in any appropriate manner as by cleats 12 and 13; and beneath the lower ends of the troughs I may place a receptacle 14 for collecting these droppings. The latter are thereby prevented from dropping into the nests, or even onto the floor of the henhouse, and in large structures it may be possible to flush the troughs occasionally or constantly with water although this detail need not be illustrated. For permitting the fowls to gain the higher perches, I may provide along one or both sides of the structure a climbing board 15, herein shown as a plain narrow strip of wood properly supported at 16, although of course it might have cleats so that in effect it would be a small ladder. Other refinements and amplifications are possible, but need not be included herein. I reserve the widest latitude in this respect, and also as to materials and proportions of parts. The roost structure shown herewith is not illustrated within a house or other place of protection, but doubtless it would be set up within the hen house or at least under a roof or shed where it would be protected from the elements, and the hens would be safe from animals which frequently attack them at night.

What is claimed as new is:—

1. In a roost for fowls, the combination with a series of spaced superposed perches A-shaped in cross section and each provided with two notches in each extremity; of two pairs of upright supports, each pair extending through the notches at one end of all the perches, and means for fastening all parts together.

2. In a roost for fowls, the combination with two pair of spaced supports; of a series of perches disposed one above the other in substantial parallelism and having notches in their extremities engaging said supports, each perch comprising a pair of boards standing at an angle to each other with their upper edges forming the ridge of a roof-shaped structure whose gables are adapted to shed the droppings off the fowls and perches below.

3. In a roost for fowls, the combination with two pairs of upright posts; of a series of perches A-shaped in cross section disposed one above the other in parallelism and extending from one pair of posts to the other, a ridge pole along the angle of each perch, and means on the posts for supporting the perches.

4. In a roost for fowls, the combination with two spaced supports; of a series of perches disposed one above the other in substantial parallelism and sustained by said supports, each perch comprising a pair of boards standing at an angle to each other with their upper edges in contact and forming the ridge of a roof-shaped structure whose gables are adapted to shed the droppings from the fowls on said ridge off the fowls and perches below, and means beneath the lower edges of the lowermost boards for collecting said droppings.

5. In a roost, the combination with uprights, and a series of superposed perches A-shaped in cross section and supported by said uprights one above the other; of a climbing board carried by said uprights and extending obliquely alongside all of said perches, for the purpose set forth.

In testimony whereof I affix my signature in presence of two witnesses.

LESLIE R. WETMORE.

Witnesses:
WILLIAM A. HIATT,
JABEZ BELFORD.